G. W. RUNDLE.
PROPULSION MECHANISM.
APPLICATION FILED DEC. 7, 1914.
1,154,208.
Patented Sept. 21, 1915.
2 SHEETS—SHEET 2.
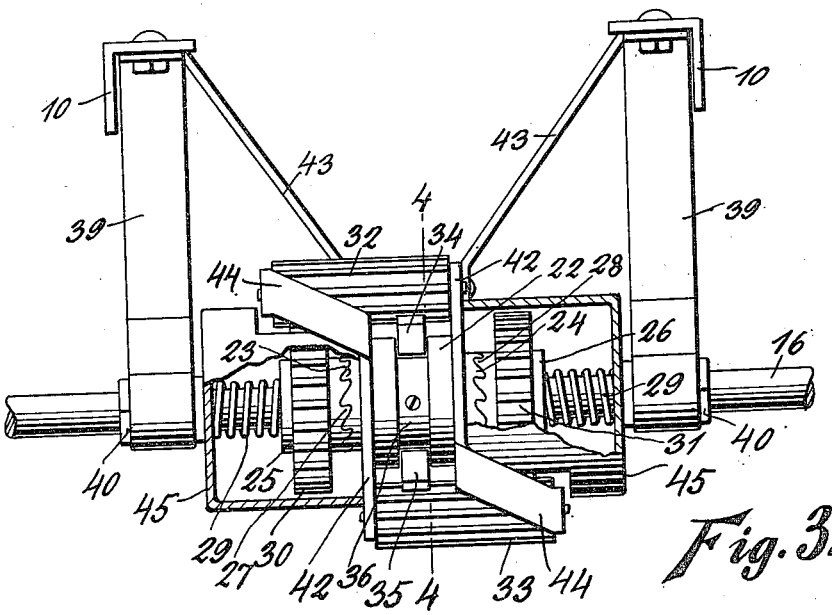
Fig. 3.
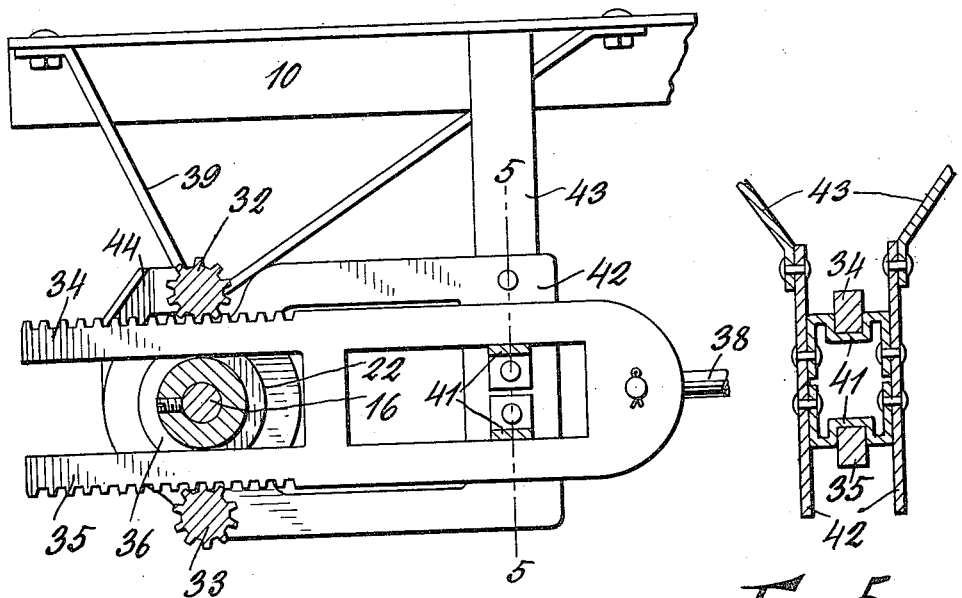
Fig. 4.
Fig. 5.
Witnesses
Einar Larson
A. R. Walton
Inventor
George W. Rundle
By Max A. Schmidt
Attorney

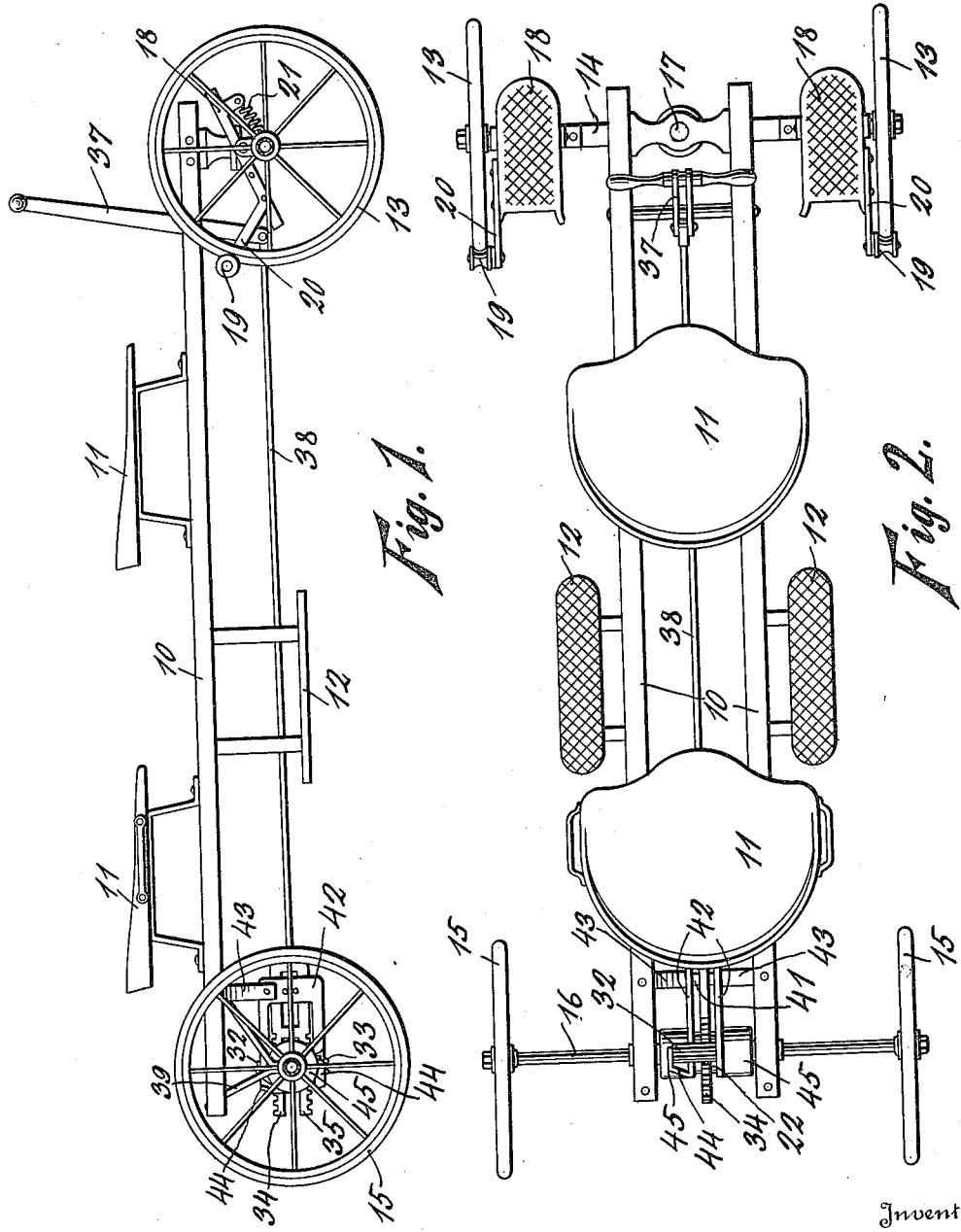

UNITED STATES PATENT OFFICE.

GEORGE W. RUNDLE, OF SPOKANE, WASHINGTON.

PROPULSION MECHANISM.

1,154,208.  Specification of Letters Patent. Patented Sept. 21, 1915.

Application filed December 7, 1914. Serial No. 875,926.

*To all whom it may concern:*

Be it known that I, GEORGE W. RUNDLE, a citizen of the United States, residing at Spokane, in the county of Spokane and State of Washington, have invented certain new and useful Improvements in Propulsion Mechanism, of which the following is a specification.

This invention relates to manually propelled vehicles for children's use, and its object is to provide a novel and improved driving or propulsion mechanism, whereby a good speed may be obtained with a minimum effort.

The herein stated object is attained by means of a combination and arrangement of parts to be hereinafter described and claimed, and in order that the same may be better understood, reference is had to the accompanying drawings forming a part of this specification.

In the drawings, Figure 1 is a side elevation of the vehicle; Fig. 2 is a plan view thereof; Fig. 3 is an elevation of the driving mechanism, with parts broken away; Fig. 4 is a longitudinal section on the line 4—4 of Fig. 3, and Fig. 5 is a vertical cross-section on the line 5—5 of Fig. 4.

Referring specifically to the drawings, the body of the vehicle comprises two spaced, parallel side bars 10 carrying one or more seats 11, two seats being shown. The side bars also carry foot rests 12 for the rear seat. The running gear of the vehicle comprises front wheels 13 carried by an axle 14, and hind wheels 15 carried by an axle 16. The front axle is swiveled on a king-bolt 17, so that it may be swung to steer the vehicle, this operation being effected by means of foot rests 18 carried by said axle, and located within reach of the feet of the occupant of the front seat 11. The foot rests 18 also carry brakes for the front wheels, said brakes being rollers 19 carried by arms 20 extending from the rear portions of said foot rests, the latter being pivoted, so that when they are pressed down, the rollers will engage the peripheries of the front wheels. Springs 21, connected to the foot rests, and anchored to the front axle, hold said foot rests so that the brake rollers are normally out of contact with the wheels, and thus release the brake rollers when the downward pressure on the foot rests is relieved.

The driving or propulsion means of the vehicle comprises the following parts: On the rear axle 16, midway between the ends thereof, is made fast a clutch member 22 in the form of a collar having teeth 23 and 24, respectively, at its ends. On the axle, on opposite sides of the member 22, are also loosely mounted clutch members 25 and 26, respectively, the same being slidable on the axle, and coöperating with the member 22. The members 25 and 26 are formed with teeth at their ends which are next to the teeth of the member 22, the teeth 27 of the member 25 being designed to engage the teeth 23, and the teeth 28 of the member 26 the teeth 24. The clutch teeth 23 and 24 are made slanting or beveled on one side, the slant or bevel of the teeth being oppositely arranged, respectively, and the slant or bevel of the teeth 27 and 28 corresponding. Thus, the members 25 and 26 transmit motion to the member 22 in one direction only. The members 25 and 26 are slidable on the axle, so that they are free to slip back out of mesh with the member 22 on the back stroke. The members 25 and 26 alternately come into driving engagement with the member 22, and the latter therefore receives a continuous motion in one direction. Springs 29 press the members 25 and 26 into working engagement with the member 22, said springs however yielding to allow said members 25 and 26 to slip back out of mesh with the member 22 on the back stroke.

The driving means for the clutch members 25 and 26 comprises the following parts: On the clutch member 25 is a toothed gear 30, and on the clutch member 26 is a similar gear element 31. These gear elements may be formed integral with the respective clutch members. In mesh with the gear 30 is a pinion 32, and with the gear 31 meshes a pinion 33. These pinions are spaced vertically, they being located respectively above and below the axle 16. The pinions are elongated so that the gears 30 and 31 will not get out of mesh during the lateral sliding movement of the clutch members 25 and 26. A toothed rack 34 meshes with the pinion 32, and a toothed rack 35 is in mesh with the pinion 33. These two racks are located respectively above and below the axle, and they are connected to travel together. Midway between the ends of the clutch member 22, the periphery thereof has an annular groove 36 to accommodate the racks. A hand lever 37, having a connection 38 with the racks, is employed for reciprocating the latter, said hand lever being fulcrumed between the side bars 10 of the vehicle, in front of the front seat 11, so as to be within reach of the occupant of said seat.

Upon operating the hand lever 37, the racks 34 and 35 are carried back and forth, thereby rotating the pinions 32 and 33 alternately in opposite directions, this motion being transmitted to the clutch members 25 and 26 through the gears 30 and 31, and said clutch members transmitting motion to the clutch member 22 in one direction, as hereinbefore described, and as said clutch member 22 is fast on the axle 16, the vehicle is propelled. The vehicle can also coast by holding the hand lever stationary, whereupon the clutch members 25 and 26 slip as the axle turns.

The side bars 10 carry depending brackets 39 at their rear ends, and said brackets carry ball-bearing boxings 40 for the axle 16.

The racks 34 and 35 slide in channeled guides 41 carried by laterally spaced plates 42, said guides being located between the plates, and the latter being supported from the side bars 10 by braces 43. The plates 42 have rearward extensions 44 which are arranged to form supports for the shafts of the pinions 32 and 33.

The clutch members 25 and 26 are provided with housings 45 having suitable openings through which the gears 30 and 31 project to come in mesh with the pinions 32 and 33.

While the preferred embodiment of the invention has been illustrated and described, it will be understood that various changes and modifications may be resorted to without departure from the scope of the invention as claimed hereinafter.

I claim:

1. A driving mechanism comprising an axle, a clutch member fast on the axle and having teeth at its ends, said teeth being oppositely arranged respectively, clutch members loosely and slidably mounted on the axle on opposite sides of the first mentioned clutch member and having teeth engageable with the teeth thereof, toothed gears on the second mentioned clutch members, pinions in mesh respectively with the toothed gears, racks in mesh respectively with the pinions, and means for reciprocating the racks.

2. A driving mechanism comprising an axle, a clutch member fast on the axle and having teeth at its ends, said teeth being oppositely arranged respectively, clutch members loosely and slidably mounted on the axle on opposite sides of the first mentioned clutch member and having teeth engageable with the teeth thereof, toothed gears on the second mentioned clutch members, pinions in mesh respectively with the toothed gears, racks in mesh respectively with the pinions, said racks being connected to travel together, and means for reciprocating the racks.

3. A driving mechanism comprising an axle, a clutch member fast on the axle and having teeth at its ends, said teeth being oppositely arranged respectively, clutch members loosely and slidably mounted on the axle on opposite sides of the first mentioned clutch member and having teeth engageable with the teeth thereof, toothed gears on the second mentioned clutch members, pinions in mesh respectively with the toothed gears, racks in mesh respectively with the pinions, means for reciprocating the racks, channeled guides for the racks, supports for the guides, and supporting means for the aforesaid pinions carried by said supports.

In testimony whereof I affix my signature in presence of two witnesses.

GEORGE W. RUNDLE.

Witnesses:
E. D. WELLER,
OLETTA BERG.

Copies of this patent may be obtained for five cents each, by addressing the "Commissioner of Patents, Washington, D. C."